(12) United States Patent
Hellwig et al.

(10) Patent No.: US 9,167,409 B2
(45) Date of Patent: Oct. 20, 2015

(54) MUSIC CONTROL SIGNAL DEPENDENT ACTIVATION OF A VOICE ACTIVITY DETECTOR

(75) Inventors: Karl Hellwig, Wonfurt (DE); Henning Buhr, Kelmis (BE); Dirk Kampmann, GP Vaals (NL)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 114 days.

(21) Appl. No.: 13/579,624

(22) PCT Filed: Feb. 19, 2010

(86) PCT No.: PCT/EP2010/052148
§ 371 (c)(1),
(2), (4) Date: Dec. 3, 2012

(87) PCT Pub. No.: WO2011/101034
PCT Pub. Date: Aug. 25, 2011

(65) Prior Publication Data
US 2013/0190037 A1    Jul. 25, 2013

(51) Int. Cl.
| H04M 1/00 | (2006.01) |
| H04W 8/02 | (2009.01) |
| H04W 76/04 | (2009.01) |
| G10L 19/012 | (2013.01) |
| G10L 25/78 | (2013.01) |

(52) U.S. Cl.
CPC .............. *H04W 8/02* (2013.01); *H04W 76/048* (2013.01); *G10L 19/012* (2013.01); *G10L 25/78* (2013.01)

(58) Field of Classification Search
CPC ............ H04M 3/428; H04M 3/42068; H04M 3/4211; H04M 3/42153; H04M 3/4285; H04M 3/487; H04M 3/533; H04M 2203/2011; H04M 3/493; H04M 3/5166; H04M 3/523
USPC ........................................ 455/550.1
See application file for complete search history.

(56) References Cited

U.S. PATENT DOCUMENTS

| 2006/0067512 | A1 | 3/2006 | Boillot et al. |
| 2006/0072716 | A1* | 4/2006 | Pham .......................... 379/88.17 |
| 2006/0198505 | A1* | 9/2006 | Kortum et al. ............ 379/201.04 |
| 2007/0161366 | A1* | 7/2007 | Kraft et al. .................. 455/412.1 |
| 2008/0008298 | A1* | 1/2008 | Kirla ........................... 379/88.03 |
| 2012/0149403 | A1* | 6/2012 | Subrahmanya ............... 455/458 |

FOREIGN PATENT DOCUMENTS

WO       2009073035 A1    6/2009

OTHER PUBLICATIONS

Schulzrinne, H., et al., "RTP Payload for DTMF Digits, Telephony Tones, and Telephony Signals," Network Working Group, Request for Comments: 4733, Category: Standards Track, Dec. 2006, The IETF Trust, pp. 1-49.

(Continued)

*Primary Examiner* — Ajibola Akinyemi
(74) *Attorney, Agent, or Firm* — Coats & Bennett, PLLC

(57) ABSTRACT

The invention relates to a method for controlling the activation of a voice activity detector for a call in which music control information inserted into the control signalling plane is used to disable and enable the voice activity detector.

6 Claims, 5 Drawing Sheets

(56) References Cited

OTHER PUBLICATIONS

3rd Generation Partnership Project, "3rd Generation Partnership Project; Technical Specification Group TSG CT; Local Call Local Switch System Impacts; Feasibility Study; (Release 9)"; Technical Report, 3GPP TR 23.889, v0.3.0, Oct. 2009, pp. 1-53, 3GPP, France.

3rd Generation Partnership Project, "3rd Generation Partnership Project; Technical Specification Group TSG CT; Local Call Local Switch System Impacts; Feasibility Study; (Release 9)"; Technical Report, 3GPP TR 23.889, v1.1.0, Jan. 2010, pp. 1-75, 3GPP, France.

* cited by examiner

MUSIC CONTROL SIGNAL DEPENDENT ACTIVATION OF A VOICE ACTIVITY DETECTOR

TECHNICAL FIELD

The present invention relates to a method of receiving control signals relating to a call, to a method for transmitting control signals relating to said call, to a speech encoding unit encoding speech for said call, and a control node controlling the control signals of said call.

BACKGROUND

In most applications of mobile communication voice was always and is still the most important media component. All speech codecs and the mechanisms around the speech codecs were optimized for voice. Music was not considered important in the design of the mobile communication components.

But since the early days of GSM, music plays a small, but not unimportant role, e.g. in "Music-on-Hold". Recently, "Customized-Alerting-Tones" and "Musical-ring-back-Tones" are becoming popular services and the perception of music becomes more important.

The current solutions are not satisfying for these services. One important observation of real time telephony is that most of the time only one partner is talking, while the other is listening. The one talking does not pay much attention to what he is hearing, as long as it is not the other partner responding. The voice-feedback is important, but otherwise the background noise is just naturally there, not important.

From this observation the conclusion was drawn to cut off speech pauses and to not transmit them. The hope was to save 50% or more of radio- and network link-capacity on average. A "Voice Activity Detection" (VAD) was developed for the discrimination between speech and pause. Later it turned out that it is very unpleasant for the user when the loudspeaker is totally silent between talk spurts of the other partner. Therefore, the so-called "Comfort Noise" was invented. The terminal receiving the speech signal creates this comfort noise on its own, just on basis of a few "Silence Descriptor" (SID) parameters, transmitted every now and then.

This operation is called "Discontinuous Transmission" (DTX), controlled by the VAD within the Speech Codec at center side and with SID frames to feed the Comfort Noise at receiver side. DTX works satisfying for voice communication and for most of the music signals.

The VAD, however, is not really working well for all music signals. Over time the VADs were improved, but some music signals are still falsely classified as "background noise" and are replaced by Comfort Noise; this is unacceptable, if the goal was to use the music as specific, paid service.

There is not much hope currently that a VAD could ever be designed that works well for all kinds of music.

In FIG. 1 a mobile-to-mobile call is shown in which an originating mobile station oMS is the calling party, the terminating mobile station tMS being the called party. In the embodiment shown in FIG. 1 the different components included in the speech path and signaling path are shown. The signaling path is indicated by reference numeral 10 and relates to the path from the oBTS (Base Station Transceiver) via the BSC (Base Station Controller), the originating Mobile Switching Center (oMSC), the intermediate Switching Center (iMSC) and the terminating Mobile Switching Center (tMSC) to the terminating Mobile Station (tMS). The speech path 20 is transmitted through the corresponding media gateways oMGW, iMGW, and tMGW to the terminating mobile station. In each of these media gateways or in the BSC there could be a speech codec including a VAD potentially destroying a music signal.

A music signal could basically be inserted in any of these media gateways without the VADs getting knowledge of this event. By way of example the music ring back tone is typically inserted in the terminating Media Gateway tMGW and is propagating backwards through iMGW, oMGW and BSC to the originating user using the originating mobile station. Up to now in most systems this drawback of the imperfect VADs was accepted and the VADs were just switched off in the wireline part of the network for the whole duration of the call. The VADs then only work in the mobile stations UMS and TMS.

DTX furthermore works well in the two radio uplinks from the mobile stations oMS to oBTS and tMS to tBTS, respectively, controlled by the VADs in the mobile stations. DTX is also working in the two radio downlinks in mobile-to-mobile calls for all signals coming from a mobile station if end-to-end transcoding free operation is applied. DTX works also on all other links in this example and reduces the load everywhere. In the case of a mobile-to-mobile call the VADs are only active in the mobile stations, resulting in a transcoding free operation helping to save downlink transmission resources.

But for mobile-to-PSTN (Public Switched Telephone Network) calls the VAD in the media gateways and the BSC are statically permanently switched off and so all the signals coming from the PSTN are transmitted downlink to 100% of the time, even if there are speech pauses included. In most networks mobile-to-PSTN calls still represent the majority of the calls. This works of course well for all signals coming from the PSTN, also for music, as intended, as the music was the reason that the VADs were switched off. An embodiment of a mobile-to-PSTN call is shown in FIG. 2, again with the signaling signal path 10 and the speech signaling path 20. As a consequence, the radio signal transmission in the downlink to the mobile station is always switched on. As a consequence, the activity on the downlink radio channel is higher than hoped for when using DTX.

Accordingly, a need exists to provide a possibility to switch on a voice activity detector when voice is transmitted and to switch off a voice activity detector when music is transmitted in order to minimize the radio signal transmission from and to the Base Transceiver Station BTS. This problem has been unsolved for years. One possibility to meet the above-referenced need is to insert inband signaling, such as specific tones or tone sequences before and after the music signal to control the VADs in the path. However, these inband signals are normally audible to the end user and these inband signals are not 100% secure and could lead to misbehavior. Additionally, these inband signals would have to pass through one or several transcoding stages and could therefore become unrecognizable for the VADs. Additionally, it would be necessary to update all the existing VADs.

SUMMARY

Accordingly, the need still exists to decrease the radio signal transmission between the mobile station and the base station controllers and to avoid the suppression of music signals by voice activity detectors.

This need is met by the features of the independent claims. In the dependent claims preferred embodiments of the invention are described.

According to a first aspect of the invention a method for receiving control signals relating to a call is provided in which it is determined whether the received control signals contain a music control information informing about the presence of a music signal in the call. A voice activity detector allowing to distinguish speech from speech pauses in said call is controlled in dependence on the received music control information. According to the present invention a new control signal is included in the control plane signaling that can be received by the control nodes present in the control signaling path. The voice activity detector can then be enabled and disabled depending on the received control information.

According to a preferred embodiment the music control information contains a music start information indicating that a music signal will follow in the call, wherein, if the music start information is detected in the received control signals of said call, the voice activity detector for said call is disabled. The music start information can trigger the disabling of the voice activity detector. Music can then be transmitted without a false detection as being noise, so that the suppression of inserted music is avoided.

Furthermore, the music control information may control a music stop information indicating that the music signal has ended. If said music stop information is detected in the received control signals of said call, the status of the voice activity detector is controlled in such a way that the status corresponding to the status before said music start information is received, is resumed. In this embodiment an additional flag is proposed indicating whether music will be inserted, the flag indicating "yes", no flag indicating "no". Thus, if the music start information is received, it can be considered as a hint for all potentially present voice activity detectors in the speech path to temporarily disable the voice activity detection and therefore the DTX. When the music stop information is detected, the previous status of the VAD can be resumed. This does not necessarily mean that the VADs are all enabled again, but it means that a status is resumed corresponding to the status that was commanded by the local mobile switching center before. If the voice activity detector was off before, then it should remain off.

As indicated above, the music control information can be a binary information element, one value of the binary information element indicating that an insertion of the music signal in the call will start, the other value of the binary information element indicating that the insertion of the music signal has ended.

However, in another embodiment it is also possible to control the selection of the speech codec type or the selection of a speech codec mode in dependence on the music control information. In one embodiment the music control information may have e.g. four different values, a first value indicating that a music signal is not present in a call informing the call control node that the voice activity detector is enabled and that a first encoder, e.g. speech encoder, is used. The music control information may have a second value indicating that the music signal will start, resulting in the step of disabling the voice activity detector and to use the first encoder. Additionally, the music control information may have a third value indicating that a music signal in a mono format will follow. As a consequence, the voice activity detector may be disabled and a second encoder dedicated for a mono music format may be used. When the music control information has a fourth value, this fourth value may indicate that a music signal in a stereo format will follow, and that as a consequence the voice activity detector is disabled and a third encoder dedicated for a stereo music format is used. In this embodiment the music control information is used to enable and disable the voice activity detector and to select the appropriate encoder at the same time. It is obvious for experts in the field that this idea can be extended to even finer granularity and other coding methods and the above example of four code-values is just an illustrative example. In another embodiment the music control information may have three different values: a first value for a first encoder, a second value for a mono encoder, and a third value for a stereo encoder. This separation into three values also allows to use the stereo encoder for speech transmission with VAD.

Thus, according to one embodiment of the invention a selection of a speech encoder encoding the speech signal of said call is adapted by selecting a dedicated speech encoder dedicated for music encoding as long as the music signal is present in the call when the music control information is detected. In the context of the present invention it should be clear that if the voice activity detector is disabled for a call, the discontinuous transmission mode DTX is also disabled for this call.

According to another aspect of the invention a method for transmitting control signals relating to said call is provided, the method comprising the step of determining whether the music signal should be inserted into the call, wherein, if it is determined that the music signal should be inserted into the call, the music start information is included into the transmitted control signals of said call. When the music signal in the call ends, the music stop information is inserted into the transmitted control signals.

Preferably, the call is a mobile entity related call in a 3GPP Circuit Switched or Packet Switched mobile network, such as GSM or UMTS mobile telecommunications network in which the music control information is received by a mobile switching center which then transmits the information to the media gateway to accordingly control the status of the voice activity detector. The invention can be applied in all mobile networks and other telecommunications networks (e.g. TDMA, CDMA 2000, WCDMA) including all wireline networks where VADs are deployed, so also in the Voice over Internet calls (VoIP) and in IMS.

The invention furthermore relates to a speech encoding unit encoding speech for a call containing a voice activity detector and a voice activity detector control unit receiving the control signals for said call. If the voice activity detector control unit detects a music control information in the received control signals, it controls the voice activity detector depending on the received music control information.

The speech encoding unit may furthermore comprise a first encoder dedicated to encode speech signals and a second encoder dedicated to encode music signals. The speech encoding unit may furthermore comprises a switch selecting either the first or the second encoder. According to one embodiment of the invention the switch selects either the first encoder or the second encoder depending on the music control information detected in the control signals of said call.

Furthermore, a call control node is provided controlling control signals of a call containing a music insertion unit configured to determine whether a music signal should be inserted into the call and configured to actually insert the music signal into the call. Furthermore, the call control node comprises a call control signal generating unit generating the control signals for said call, wherein, when the music insertion unit determines that a music signal should be inserted into the call, the call control signal generating unit includes the music control information into the control signals of said call informing about a presence of a music signal.

BRIEF DESCRIPTION OF THE DRAWINGS

The invention will be described in further detail with reference to the accompanying drawings, in which.

DETAILED DESCRIPTION

Figure 1:
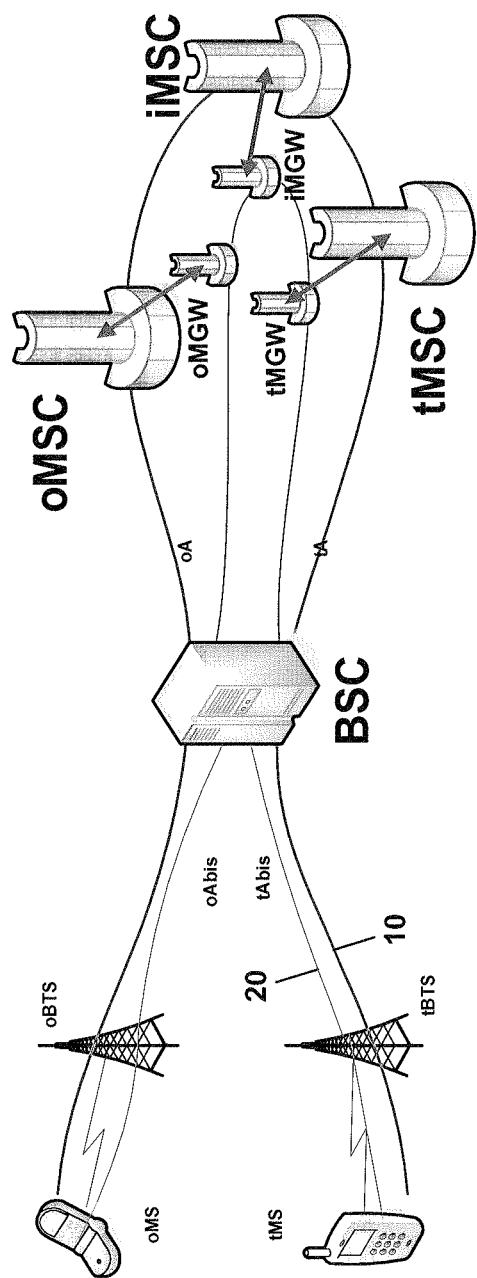
FIG. 1 shows the signal path of the speech signal and control signal in a mobile-to-mobile call.
Figure 2:
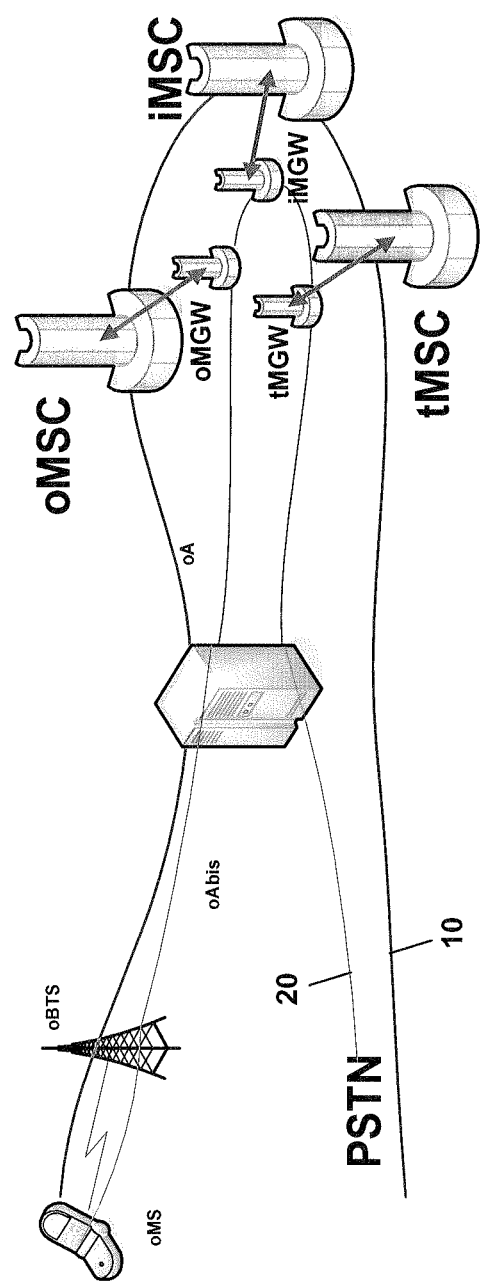
FIG. 2 shows a mobile-to-PSTN call with the speech signals and the control signals.
Figure 3:
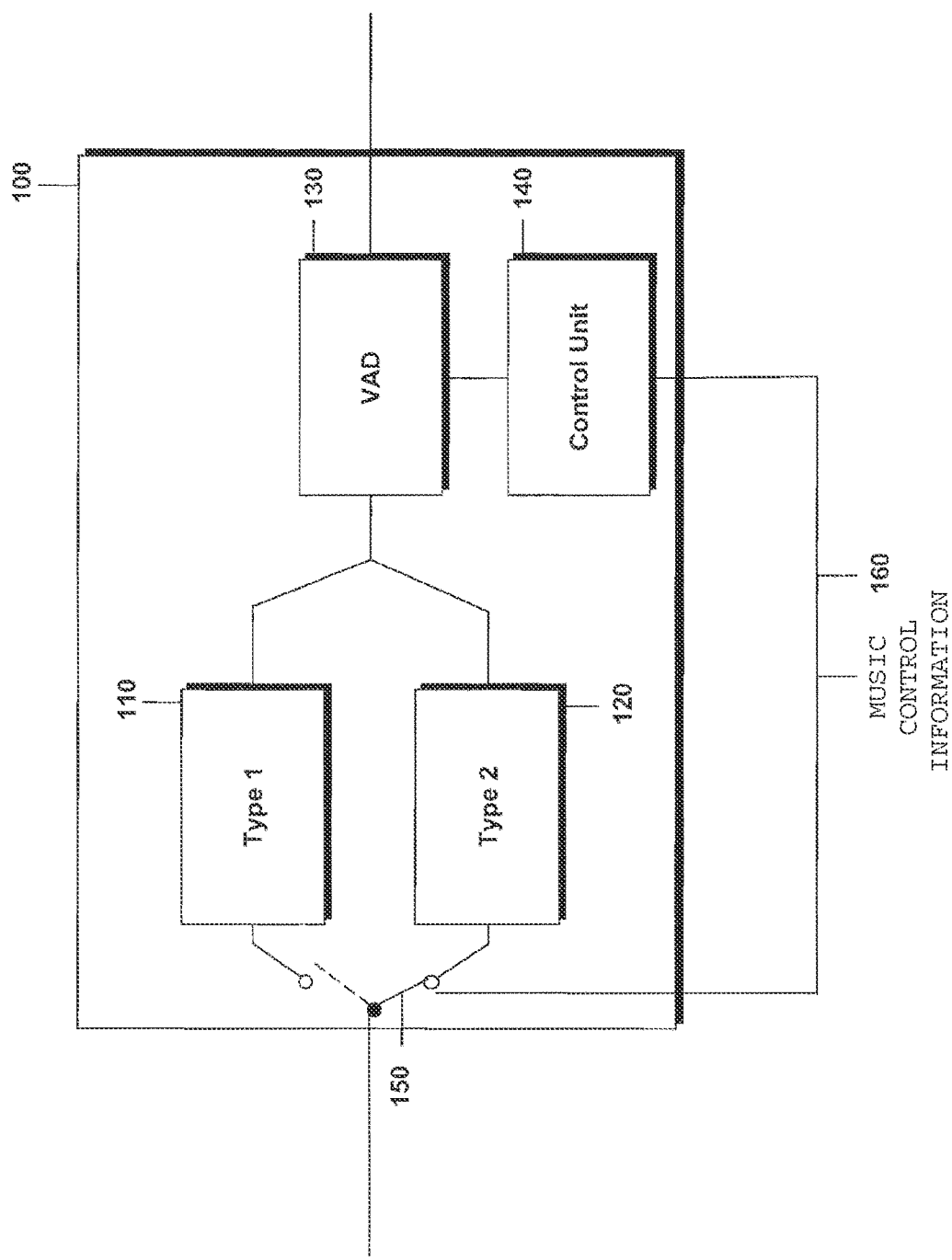
FIG. 3 shows a speech encoding unit allowing to control a voice activity detector in dependence on music control signals.
Figure 4:
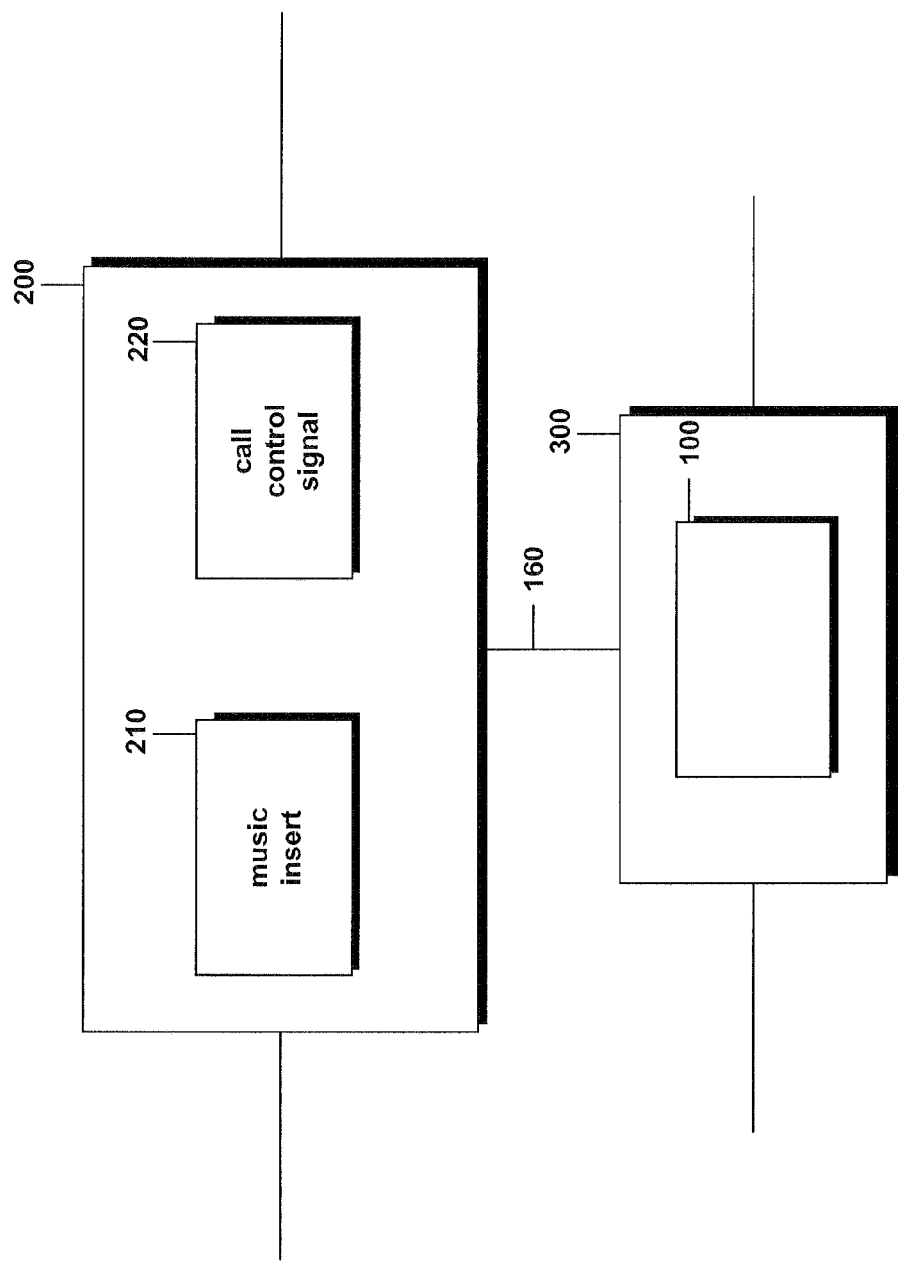
FIG. 4 shows a system of a mobile switching center with a media gateway including the speech encoding unit of FIG. 3.

In FIG. 3 a speech encoding unit 100 is shown that could be incorporated in a media gateway 300 as shown in FIG. 4. However, the speech encoding unit 100 could also be incorporated into the Base Station Controller BSC as shown in FIGS. 1 and 2. Generally, the speech encoding unit 100 could be incorporated anywhere where a speech codec and a voice activity detector are used. In the embodiment shown the speech encoding unit comprises a first encoder 110 and a second encoder 120, a voice activity detector 130 and a control unit 140 controlling the voice activity detector 130. In the embodiment shown two different types of speech encoding units are used. However, the system of FIG. 3 could also contain only one speech encoder used to encode and decode speech. The voice activity detector is a detector configured to discriminate between speech and speech pauses. As known in the art, the voice activity detector can control the discontinuous transmission DTX within the speech encoder 110 or 120.

As discussed in the introductory part of the description, any control node, such as the control node 200, may insert a music signal through its associated media gateway 300 into the user plane. To this end a music insertion unit 210 is provided in the MSC 200 as shown in FIG. 4. Furthermore, a call control signal generating unit 220 is present in the MSC that is able to insert a music control information into the control signals. Before the music signal is inserted into the call, the other control nodes have to be informed through the control plane that music is coming and afterwards that the music has ended. To this end the call control signal generating unit inserts a music start information into the control plane indicating that a music signal will follow and a music stop information when the music signal has ended. This music control information is received by the voice activity detector control unit 140 shown in FIG. 3 that controls the VAD 130 in dependence on the received control signals. When the music start information is detected, the VAD may be disabled, and when the music start information is detected, the VAD may be enabled again. If the VAD 130 is disabled when the music start information is received, the VAD will stay disabled, and when the music stop information is received, the VAD may stay disabled if it has been disabled before the music start information has been received. Thus, when the call control nodes, such as the nodes 200, detect the music control information in the control signals, the media gateways have to be informed accordingly. The reception of the corresponding control signal at the media gateway is symbolized by line 160 shown in FIG. 3. If the music start information is received by the call control node, the signal can temporarily disable the VADs 130 and the DTX for all potentially present VADs in the speech path as shown in FIGS. 1 and 2.

In the embodiment shown the speech encoding unit contains two different encoders. The selection of one of the encoders by switch 150 can also be made dependent on the received music control information. If it is detected in the music control information that a music signal will follow, an encoder, e.g. encoder 120, may be selected that is dedicated for a music encoding. If it is detected that the music signal has ended, the switch may switch back to the first encoder 110 that may be a dedicated encoder for speech. In this embodiment the speech codec is switched into a speech compatible mode or music compatible mode in dependence on the presence of a music signal in the call. By way of example the first encoder 110 may be a AMR-WB-encoder that is very good for enhanced voice communication but less good for music, the encoder 120 being an AMR-WB-plus-encoder that is dedicated for music supporting even stereo playback. To fully deploy this embodiment, the AMR-WB-plus needs to be included into the real-time communication by the usual extension on the control plane, e.g. by defining a new codec type, and the framing and channel coding on the user plane.

In another embodiment more than two different speech encoders may be present. In this embodiment the music control information may have more than two different values, e.g. four values. The first value indicates that no music is present and that the VAD should be enabled and that the normal speech encoder should be used, a second value may indicate that the music starts and that the VAD should be disabled and that the normal speech encoder should be used. A third value could indicate that the music in a mono format will start and that the VAD should be disabled and that, e.g., a music encoder for mono should be used, a fourth value indicating that a music in stereo format will follow resulting in a step to disable the VAD and to use a music encoder for stereo. In another embodiment three different encoders might be used: a first encoder for speech, a second encoder for a specific music signal (e.g. mono or medium bandwidth), and a third encoder for a specific other music signal (e.g. stereo or 5+1 or high bandwidth). In this embodiment three different values of the music control information might be used and the switch selects one of the three encoders in dependence on the value of the music control information. Thus, the encoder is selected in dependence on the received music control information including a music start/stop information and including an encoder selection information which encoder to use as a codec. This music control information can be coded in two, three or more different values.

In the embodiments shown in FIGS. 3 and 4 only the functional units are shown that are needed for the understanding of the present invention. It should be understood that the MSCs and the media gateways contain additional features which were, however, omitted for the sake of clarity. Furthermore, the different units have been shown as separate units. It should be understood that the different units could be combined into one unit or several units. Furthermore, the functions provided by the unit could be incorporated by hardware or software or by a combination of hardware and software.

Figure 5:
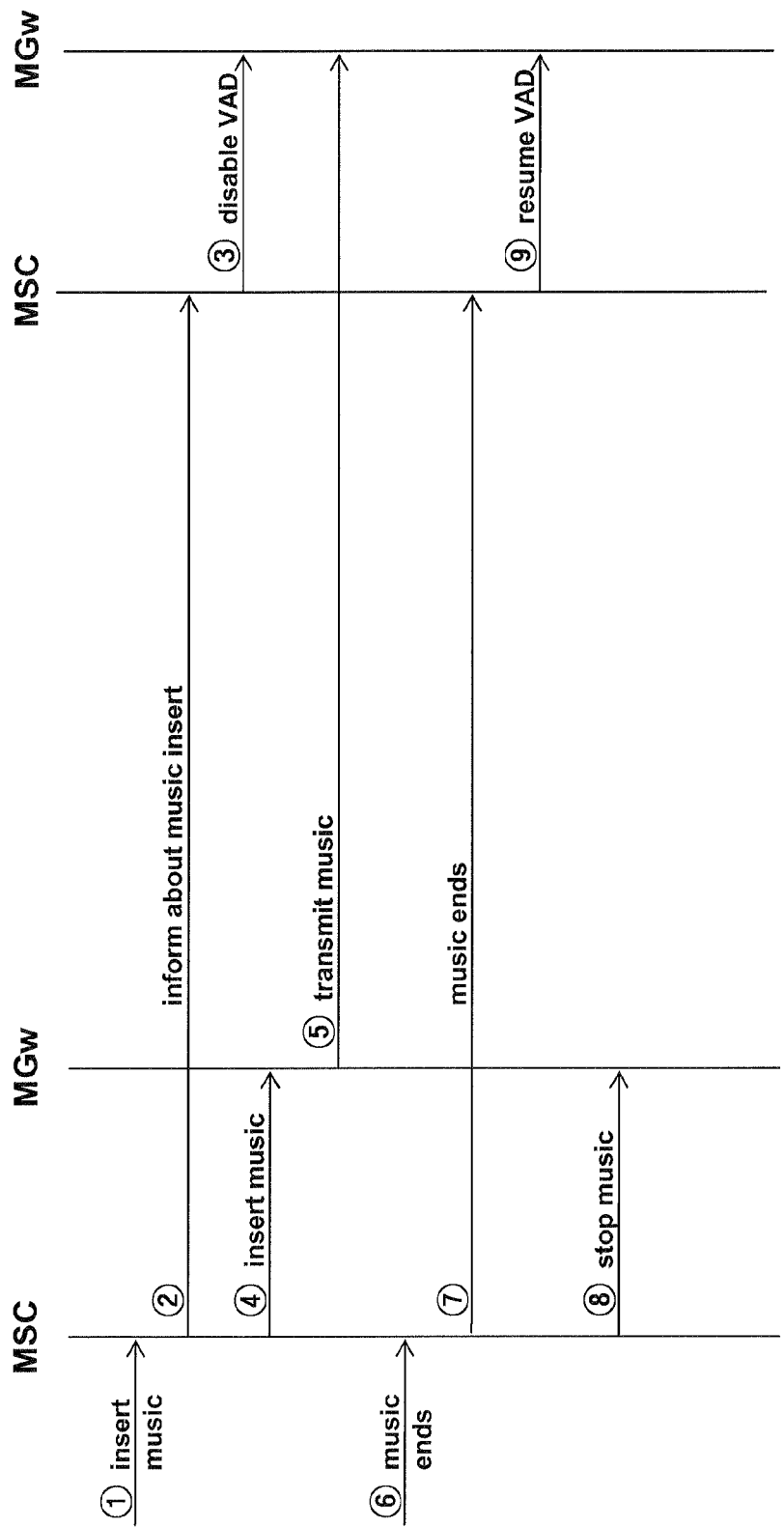
FIG. 5 shows a signaling flow for disabling a voice activity detector with the system shown in FIG. 4.

In FIG. 5 the signal control path is summarized. In a first step the MSC may receive the information that music should be inserted into the call. In another embodiment the MSC may decide itself to introduce a music signal into the call. Before the music is actually inserted, the MSC may inform the next call control node in a signal path that a music signal will be inserted, e.g. by inserting the music start information into the control plane. The call control node receiving the music start information will inform in step 3 the corresponding media gateway accordingly. Thus, the VAD will be disabled (step 3). In step 4 the first control node then inserts the music through its associated media gateway into the user plane, the associated media gateway transmitting the music in step 5. When the media gateway detects in step 6 that the music will end or has ended, the corresponding music stop information is included into the control signaling path to the next call control node (step 7). The receiving call control node can then inform to resume the VAD in step 8. The music is then stopped in step 9.

The synchronization between the control plane and the user plane is not very critical for the application shown in FIG. 5. This is the reason why the presently used out-of-band signaling is the easiest and best solution for controlling the transmission of music. The idea described above in connection with circuit switched networks could also be extended to Voice-over-IP (VoIP) networks, as the same problem with voice activity detectors exist in VoIP-based networks and in IMS and TISPAN or other VoIP networks. In these IP-based networks the additional control signaling, such as the music start and stop information could be achieved by specific RTP packets, similar to the telephone event packets as specified in IETF RFC 4733 for DTMF signaling. Another possibility could be to insert the music control information in the SIP (Session Initiation Protocol) signaling.

Summarizing, by applying the present invention signaling, the VAD/DTX scheme is typically active for all signals in uplink (VAD in the mobile station) and downlink (VAD in media gateways) all call time long. This helps to reduce the traffic load noticeably. As a consequence, the DTX gain can be kept at a very high degree.

Just for the duration of a music signal or any other sensitive audio signal the VAD/DTX can be switched off. By that the music perception is substantially improved.

The invention claimed is:

1. A method of receiving control signals relating to a call, comprising:
    determining whether received control signals contain music control information informing about a presence of a music signal in the call, wherein the music control information contains music start information indicating that a music signal will follow in the call;
    controlling a voice activity detector of a media gateway based on the received music control information, the voice activity detector configured to distinguish speech from speech pauses in the call;
    wherein, if the music start information is detected in the received control signals of the call, the voice activity detector for the call is disabled;
    wherein, when the music start information is detected by a control node of the call, the media gateway is instructed to switch off the voice activity detector until a music stop signal is detected by the call control node;
    wherein, in response to detecting the music stop signal, the call control node instructs the media gateway to place the voice activity detector in a status corresponding to a status thereof before the music start information was received.

2. The method of claim 1:
    wherein the music control information contains the music stop information indicating that the music signal has ended;
    wherein, in response to detecting the music stop information in the received control signals of the call, the voice activity detector is controlled so as to resume a status corresponding to a status thereof before the music start information was received.

3. The method of claim 1 wherein the music control information is a binary information element, one value of the binary information element indicating that a insertion of the music signal in the call will start, the other value of the binary information element indicating that the insertion of the music signal in the call has ended.

4. The method of claim 1 wherein the music control information is a music information element containing at least one of the following different values:
    a first value indicating that a music signal is not present in the call, wherein the voice activity detector is enabled and a first encoder is used for encoding the speech signal of the call;
    a second value indicating that the music signal will start, wherein the voice activity detector is disabled and the first encoder is used for encoding the speech signal of the call;
    a third value indicating that a music signal in a mono format will follow, wherein the voice activity detector is disabled and a second encoder dedicated for the mono format is used for encoding the speech signal of the call;
    a fourth value indicating that a music signal in a stereo format will follow, wherein the voice activity detector is disabled and a third encoder dedicated for the stereo format is used for encoding the speech signal of the call.

5. The method of claim 1 wherein, in response to detection of the music control information in the control signals of the call, a dedicated speech encoder dedicated for music coding is selected for encoding the speech signal of the call for as long as the music signal is present in the call.

6. The method of claim 1 wherein, in response to the voice activity detector being disabled for the call, a discontinuous transmission mode (DTX) for the call is disabled.

* * * * *